(12) United States Patent
Akuzawa et al.

(10) Patent No.: US 10,432,027 B2
(45) Date of Patent: Oct. 1, 2019

(54) MOVABLE PORTION TRANSMISSION SYSTEM USING WIRELESS POWER TRANSMISSION

(71) Applicant: MITSUBISHI ELECTRIC ENGINEERING COMPANY, LIMITED, Chiyoda-ku (JP)

(72) Inventors: Yoshiyuki Akuzawa, Chiyoda-ku (JP); Kiyohide Sakai, Chiyoda-ku (JP); Toshihiro Ezoe, Chiyoda-ku (JP); Yuki Ito, Chiyoda-ku (JP)

(73) Assignee: MITSUBISHI ELECTRIC ENGINEERING COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 15/303,949

(22) PCT Filed: May 13, 2014

(86) PCT No.: PCT/JP2014/062720
§ 371 (c)(1),
(2) Date: Oct. 13, 2016

(87) PCT Pub. No.: WO2015/173890
PCT Pub. Date: Nov. 19, 2015

(65) Prior Publication Data
US 2017/0047787 A1 Feb. 16, 2017

(51) Int. Cl.
*H02J 50/12* (2016.01)
*H02J 50/40* (2016.01)
(Continued)

(52) U.S. Cl.
CPC .............. *H02J 50/12* (2016.02); *H01F 38/18* (2013.01); *H02J 50/10* (2016.02); *H02J 50/40* (2016.02)

(58) Field of Classification Search
CPC . H01F 38/18; H02J 50/10; H02J 50/12; H02J 50/40
See application file for complete search history.

(56) References Cited

U.S. PATENT DOCUMENTS

| 5,521,444 | A | * | 5/1996 | Foreman | ................. | H01F 38/18 307/104 |
| 2007/0024575 | A1 | * | 2/2007 | Makuth | .................. | H01F 38/18 345/156 |

(Continued)

FOREIGN PATENT DOCUMENTS

| JP | 63-124735 A | 5/1988 |
| JP | 4-133808 A | 5/1992 |

(Continued)

OTHER PUBLICATIONS

International Search Report dated Jun. 10, 2014 in Application No. PCT/JP2014/062720, Filed on May 13, 2014.

(Continued)

*Primary Examiner* — Rexford N Barnie
*Assistant Examiner* — Elim Ortiz
(74) *Attorney, Agent, or Firm* — Oblon, McClelland, Maier & Neustadt, L.L.P.

(57) ABSTRACT

A movable portion transmission system includes a transmitter and receiver having a transmission antenna to perform wireless transmission of electric power supplied thereto and a reception antenna to receive the electric power from the transmission antenna, a transmission power supply circuit to establish a resonance condition of the transmission antenna, and a reception power supply circuit to establish a resonance condition of the reception antenna. The transmission antenna includes a transmission side coil in a spiral shape which is arranged while being centered at the axial center of a rotary member, and the reception antenna includes a reception side coil in a spiral shape which is arranged with (Continued)

a gap therefrom to the transmission side coil while being centered at the axial center of the rotary member.

11 Claims, 3 Drawing Sheets

(51) Int. Cl.
   *H01F 38/18*   (2006.01)
   *H02J 50/10*   (2016.01)

(56) References Cited

U.S. PATENT DOCUMENTS

| | | | | |
|---|---|---|---|---|
| 2010/0033021 | A1* | 2/2010 | Bennett | H02J 17/00 307/104 |
| 2012/0007442 | A1* | 1/2012 | Rhodes | H01F 38/14 307/104 |
| 2013/0009462 | A1 | 1/2013 | Amano et al. | |
| 2015/0280446 | A1 | 10/2015 | Akuzawa et al. | |
| 2015/0280447 | A1 | 10/2015 | Akuzawa et al. | |

FOREIGN PATENT DOCUMENTS

| | | |
|---|---|---|
| JP | 6-315237 A | 11/1994 |
| JP | 2007-208201 A | 8/2007 |
| JP | 2011-019293 A | 1/2011 |
| JP | 2011-166885 A | 8/2011 |
| JP | 5449502 B1 | 3/2014 |
| WO | 2011/118404 A1 | 9/2011 |
| WO | 2013/114576 A1 | 8/2013 |
| WO | 2014/069093 A1 | 5/2014 |

OTHER PUBLICATIONS

Extended European Search Report dated Nov. 14, 2017 in European Patent Application No. 14891904.6.
Japanese Office Action dated Aug. 7, 2018 in Japanese Patent Application No. 2017-201079 (with unedited computer generated English translation), 11 pages.
Japanese Office Action dated Oct. 2, 2018 in Japanese Patent Application No. 2016-519019 (with English translation), 9 pages.

* cited by examiner

MOVABLE PORTION TRANSMISSION SYSTEM USING WIRELESS POWER TRANSMISSION

FIELD OF THE INVENTION

The present invention relates to a movable portion transmission system using wireless power transmission that can implement, in a noncontact manner, a function of transmitting electric power by using a slip ring device that requires a mechanical contact.

BACKGROUND OF THE INVENTION

Conventionally, a slip ring device having a mechanical contact is used when a power source line is connected to load equipment or the like via a structural rotary member.

This slip ring device is comprised of a ring-shaped slip ring to which a transmission power supply is connected and which is arranged on the outer surface of the rotary member via an insulator, and a brush to which a reception power supply is connected and which is in sliding contact with to the outer surface of a slip ring. Load equipment or the like is connected to the reception power supply. With this configuration, the slip ring and the brush are electrically connected to each other, and the electric power can be transmitted from the transmission power supply to the reception power supply. In addition, by providing multiple pairs each having the slip ring and the brush in that slip ring device, multiplexing of a plurality of electric power can be carried out.

RELATED ART DOCUMENT

Patent Reference

Patent reference 1: Japanese Patent No. 5449502

SUMMARY OF THE INVENTION

Problems to be Solved by the Invention

However, in the slip ring device, degradation due to wear occurs in the contact, which is a mechanical contact, between the slip ring and the brush. Therefore, a problem is that the life of the power transmission system is limited by the degradation due to wear.

On the other hand, as a technique which replaces that technique, a transmission system using non-contact wireless power transmission is known (for example, refer to patent reference 1). In the transmission system disclosed by this patent reference 1, as shown in, for example, FIG. 3, a transmission antenna includes a transmission side coil 101 arranged while being centered at the axial center of a rotary member, and a transmit side spacer 102 having predetermined magnetic permeability which is arranged while being centered at the axial center of the transmission side coil 101 with which the transmit side spacer pairs up, in such a way as to control the magnetic flux by the transmission side coil 101. Further, a reception antenna includes a reception side coil 103 arranged while being centered at the axial center of the rotary member, and a reception side spacer 104 having predetermined magnetic permeability which is arranged while being centered at the axial center of the reception side coil 103 with which the reception side spacer pairs up, in such a way as to control the magnetic flux by the reception side coil 103. In the example of FIG. 3, a case in which two transmission and reception antennas are disposed is shown, and suffix symbols a and b are added to reference numerals respectively denoting their functional units. Further, a reference numeral 105 denotes a hollow spacer for connection for connecting between the transmission and reception antennas. With this configuration, the function of transmitting power by using the slip ring device can be implemented in a non-contact manner.

However, in the transmission system disclosed by the patent reference 1, each transmission and reception antennas is configured using spacers 102 and 104 each having predetermined magnetic permeability, which are used for controlling the magnetic flux. Therefore, a problem is that the coil shape of each transmission and reception antennas is limited to a helical shape or the like from the viewpoint of manufacturing. Another problem is that a power loss occurs due to an eddy current in each of the spacers 102 and 104 each having magnetic permeability, and the transmission system increases in mass, volume and cost because of the spacers 102 and 104.

The present invention is made in order to solve the above-mentioned problems, and it is therefore an object of the present invention to provide a movable portion transmission system using wireless power transmission that can implement, in a non-contact manner, a function of transmitting electric power by using a slip ring device and can achieve reduction in the electric power loss (high efficiency), and can achieve downsizing, a weight reduction and a cost reduction implement.

Means for Solving the Problem

In accordance with the present invention, there is provided a movable portion transmission system using wireless power transmission which is performed via a rotary member, the movable portion transmission system including: a primary transmission power supply to supply electric power; a transmitter and receiver configured with a transmission antenna to perform wireless transmission of the electric power from the primary transmission power supply, and a reception antenna to receive the electric power from the transmission antenna with which the reception antenna pairs up; a transmission power supply circuit to establish a resonance condition of the transmission antenna with which the transmission power supply circuit pairs up; and a reception power supply circuit to establish a resonance condition of the reception antenna with which the reception power supply circuit pairs up, in which the transmission antenna is comprised of a transmission side coil in a spiral shape which is arranged while being centered at an axial center of the rotary member, and the reception antenna is comprised of a reception side coil in a spiral shape which is arranged with a gap therefrom to the transmission side coil while being centered at the axial center of the rotary member.

Advantages of the Invention

Because the movable portion transmission system according to the present invention is configured as above, the movable portion transmission system can implement, in a non-contact manner, a function of transmitting the electric power by using a slip ring device and can achieve a reduction in the electric power loss (high efficiency), and can achieve downsizing, a weight reduction and a cost reduction.

BRIEF DESCRIPTION OF THE FIGURES

FIG. 2(a) is a perspective view of the transmitter and receiver and FIG. 2(b) is a front view of a transmission antenna and a reception antenna.

EMBODIMENTS OF THE INVENTION

Hereafter, the preferred embodiments of the present invention will be explained in detail with reference to the drawings.

Embodiment 1

Figure 1:
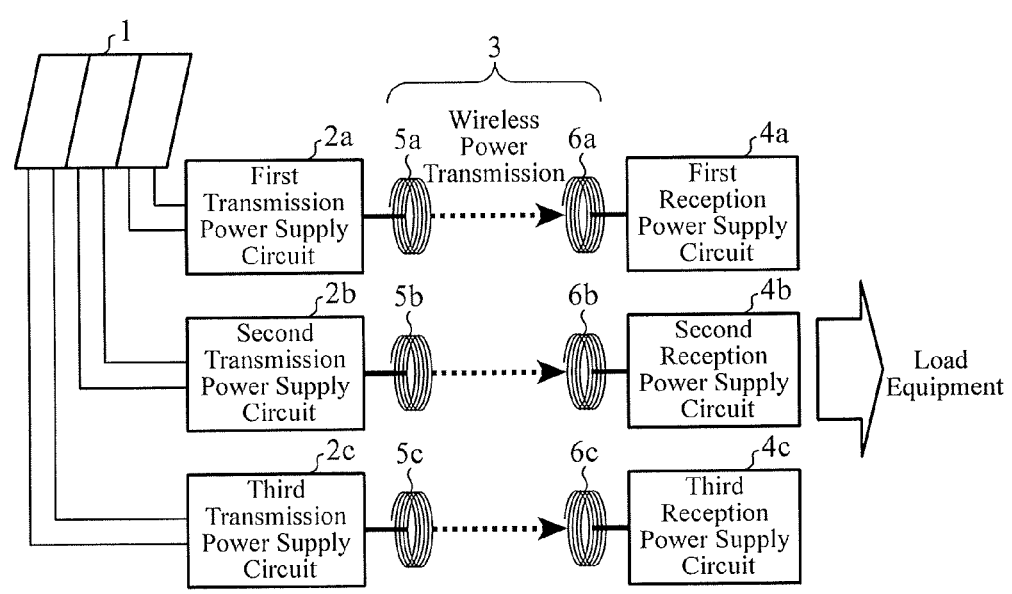
FIG. 1 is the schematic diagram showing the configuration of the movable portion transmission system using wireless power transmission according to Embodiment 1 of the present invention.

FIG. 1 is a schematic diagram showing the configuration of a movable portion transmission system using wireless power transmission according to Embodiment 1 of the present invention.

The movable portion transmission system using wireless power transmission is used in the case of connecting a power source line to load equipment or the like (not shown) via a structural rotary member (not shown), and is a device that performs wireless transmission of electric power including an electric signal. In FIG. 1, a case of providing multiple wireless power transmission functions and performing wireless transmission of a plurality of electric power including electric signals in parallel is shown.

This movable portion transmission system using wireless power transmission is comprised of a primary transmission power supply 1, a transmission power supply circuit 2, a transmitter and receiver 3 and a reception power supply circuit 4, as shown in FIG. 1. Further, the transmitter and receiver 3 has a transmission antenna 5 and a reception antenna 6. In addition, in the movable portion transmission system shown in FIG. 1, in order to perform multiplex transmission, a plurality of transmission power supply circuits 2, a plurality of transmission antennas 5, a plurality of reception antennas 6 and a plurality of reception power supply circuits 4 are disposed (in the example of FIG. 1, a case in which three sets are disposed is shown and suffix symbols a to c are added to the reference numeral denoting each functional unit).

The primary transmission power supply 1 supplies electric power to each transmission antenna 5 via the corresponding transmission power supply circuit 2.

Each transmission power supply circuit 2 is arranged between the primary transmission power supply 1 and the corresponding transmission antenna 5, and establishes the resonance condition of the transmission antenna 5, with which the transmission power supply circuit pairs up, by using resonance impedance control.

Each transmission antenna 5 performs wireless transmission of the electric power supplied thereto from the primary transmission power supply 1 to the corresponding reception antenna 6 via the transmission power supply circuit 2 with which the transmission antenna pairs up. The details of the configuration of that transmission antenna 5 will be described later.

Each reception antenna 6 receives the electric power from the transmission antenna 5 with which the reception antenna pairs up. The electric power received by this reception antenna 6 is supplied to the load equipment or the like not shown via the corresponding reception power supply 4. The details of the configuration of this reception antenna 6 will be described later.

Each reception circuit 4 is arranged between the corresponding reception antenna 6 and the load equipment or the like, and establishes the resonance condition of the reception antenna 6 with which the reception circuit pairs up by using input impedance control.

A wireless transmission method which each transmitter and receiver 3 uses is not limited particularly, and can be any one of a method in accordance with magnetic-field resonance, a method in accordance with electric-field resonance, and a method in accordance with electromagnetic induction.

Figure 2:
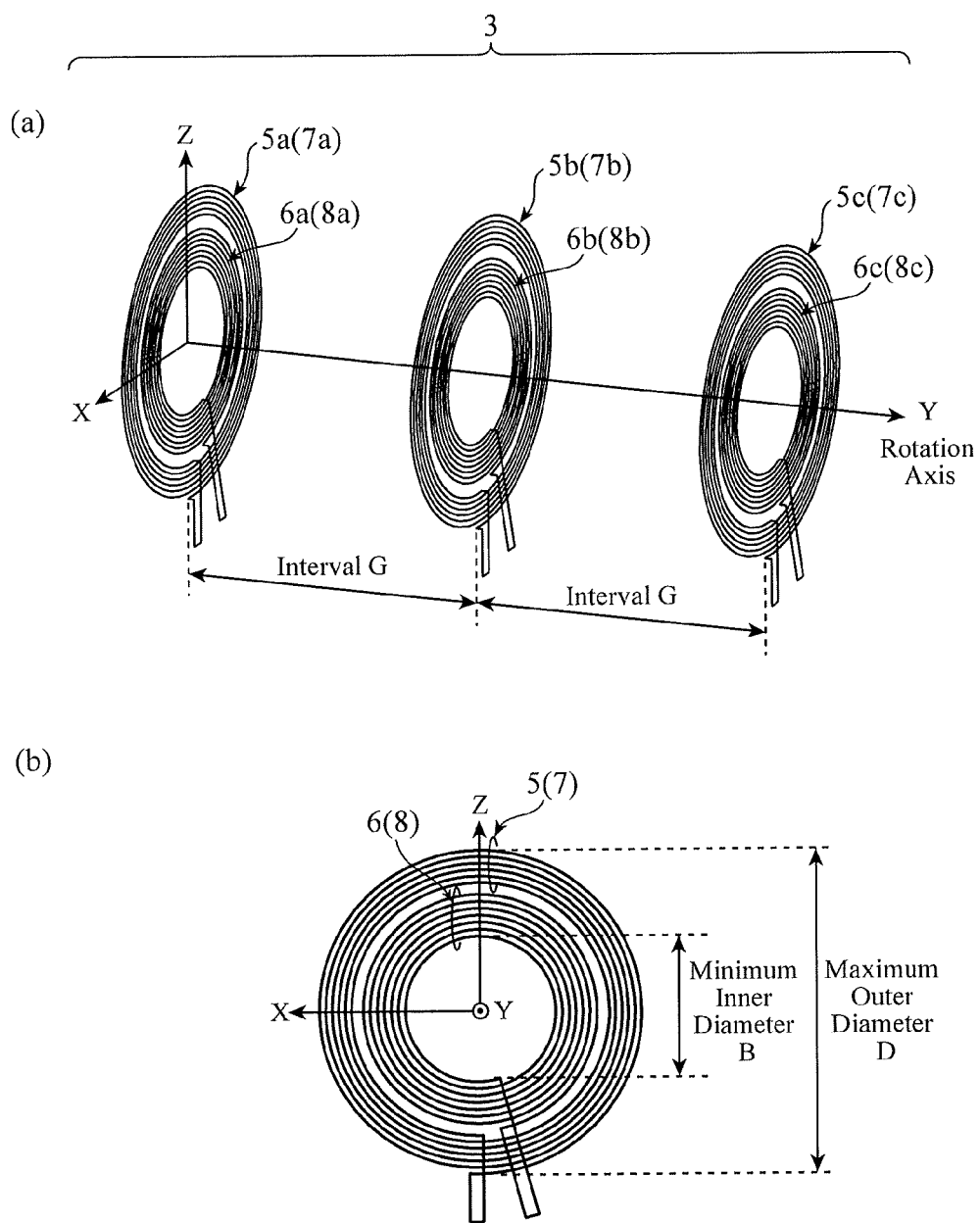
FIG. 2 is a schematic diagram showing the configuration of a transmitter and receiver according to Embodiment 1 of the present invention.
Figure 3:
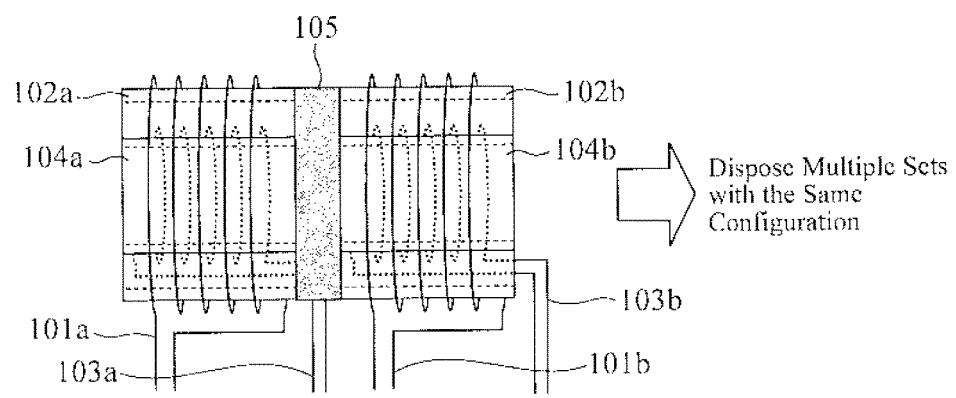
FIG. 3 is a schematic diagram showing the configuration of a transmitter and receiver of a conventional movable portion transmission system using wireless power transmission.

Next, the configuration of each transmitter and receiver 3 will be explained while referring to FIG. 2. FIG. 2 is a schematic diagram showing the configuration of the transmitters and receivers 3 according to Embodiment 1 of the present invention, FIG. 2 (a) is a perspective view of the transmitters and receivers 3, and FIG. 2(b) is a front view of each set of a transmission antenna 5 and a reception antenna 6. Although the configuration in which each transmission antenna 5 is arranged outside the corresponding reception antenna 6 is shown in FIG. 2, a configuration can be alternatively provided in which each transmission antenna 5 and the corresponding reception antenna 6 are arranged reversely relative to the above-mentioned arrangement.

In each transmitter and receiver 3, the transmission antenna 5 and the reception antenna 6 which pair up with each other are arranged with a gap between them, as shown in FIG. 2 (a). Further, in the case of the multiple-set configuration, the transmission antennas 5 and the reception antennas 6 in the plurality of sets are arranged at intervals along a direction (Y-direction shown in FIG. 2 (a)) of the axial center of the rotary member. In the example of FIG. 2 (a), the case in which the three transmitters and receivers 3 are disposed is shown, and the suffix symbols a to c are added to the reference numeral denoting each functional unit.

This transmission antenna 5 is comprised of a transmission side coil 7 in a spiral shape which is arranged while being centered at the axial center of the rotary member (this configuration also includes a configuration in which the transmission side coil is centered substantially at the axial center), as shown in FIG. 2 (b). The transmission side coil 7 is fixed on an insulating material (e.g., acrylics, glass epoxy, CFRP (carbon fiber reinforced plastics), kapton, resin, or the like). Further, the reception antenna 6 is comprised of a reception side coil 8 in a spiral shape which is arranged with a gap therefrom to the transmission side coils 7 while being centered at the axial center of the rotary member (this configuration also includes a configuration in which the reception side coil is centered substantially at the axial center). In the example of FIG. 2, each reception side coil 8 is arranged inside the corresponding transmission side coil 7. Further, each transmission antenna 5 and the corresponding reception antenna 6 are arranged in such a way that their surfaces are on the same plane or offset from each other (in the example of FIG. 2, a case in which the surfaces are on the same plane is shown).

In the example shown in FIG. 2, the coil shapes of the transmission antenna 5 and the reception antenna 6 of each set are circular. However, this embodiment is not limited to this shape, the coils can have arbitrary shapes, such as elliptical or square shapes.

Further, in the case in which the plurality of sets of the transmission antenna 5 and the reception antenna 6 are arranged in parallel along the direction of the axial center of the rotary member, the power transmission efficiency characteristics change due to the interval G between the sets. More specifically, the power transmission efficiency characteristics are improved with increase in the interval G.

Here, the interval G between the plurality of sets is set in consideration of the phase of the magnetic field generated from each transmission antenna 5 in such a way that the mutual interference between the plurality of sets is reduced. For example, in the example of FIG. 2, the interval G is designed in such a way as to be equal to or greater than the maximum outer diameter D of each transmission antenna 5 and the corresponding reception antenna 6 which pair up with each other, or equal to or greater than the minimum inner diameter B of each transmission antenna 5 and the corresponding reception antenna 6 which pair up with each other.

As mentioned above, because the movable portion transmission system according to this Embodiment 1 is configured in such a way as to include the transmission antenna 5 comprised of the transmission side coil 7 in a spiral shape which is arranged while being centered at the axial center of the rotary member, and the reception antenna 6 comprised of the reception side coil 8 in a spiral shape which is arranged with a gap therefrom to the transmission side coil 7 while being centered at the axial center of the rotary member, the function of transmitting the electric power by using the slip ring device can be implemented in a non-contact manner. As a result, the life limitation resulting from the degradation due to wear in the mechanical contact is eliminated, and an extension of the life of the device can be achieved. Further, for the wireless power transmission, a contact failure due to contamination, leakage of electricity due to condensation, etc. can be prevented, and the reliability of the device is improved. In addition, because a spark or the like, which may conventionally occur due to wear in the mechanical contact, is prevented from occurring, the movable portion transmission system can be caused to operate in an inflammable gas or fluid.

Further, because the spacers 102 and 104 each having predetermined magnetic permeability for controlling the magnetic flux are not used, unlike in the case of using a conventional technology, no limitation in terms of manufacturing is imposed on the coil shapes of the transmission antennas 5 and the reception antennas 6. In addition, the power loss, which is conventionally caused by the eddy current in each of the spacers 102 and 104, does not occur, and the increase in the mass, the volume and the cost, which is conventionally due to the spacers 102 and 104, is eliminated. Therefore, a reduction in the electric power loss (high efficiency) over the conventional configuration can be achieved, and downsizing, a weight reduction and a cost reduction can be achieved.

Further, in the case of the multiple-set configuration, because the plurality of sets are arranged at intervals of G in consideration of the phase of the magnetic field generated from each transmission antenna 5 in such a way that the mutual interference between the plurality of sets is reduced, the multiplex transmission based on the high-efficiency wireless power transmission can be implemented.

The case in which the transmission antennas 5 and the reception antennas 6 are comprised of single coils 7 and 8, respectively is shown in the above-mentioned embodiment. However, this embodiment is not limited to this example. Each of the coils 7 and 8 can consist of a coil for electric supply and a coil for resonance, or can consist of two or more coils.

Further, in the above-mentioned embodiment, the electric power which the primary transmission power supply 1 and the transmission power supply circuit 2 supply to the transmission antenna 5 can have a frequency which is the same or different for each of the plurality of sets. When the frequency differs among the plurality of sets, the resonance condition of the transmission antenna 5 and the reception antenna 6 also differs among the plurality of sets.

Further, in each reception antenna 6, the resonance condition changes according to the gap therefrom to the transmission antenna 5 with which the reception antenna pairs, the load current, the load impedance, etc. Therefore, a function of causing the resonance condition to be established in the reception antenna 6 to be variable in accordance with a change of these transmission states can be added to each reception power supply circuit 4. Further, similarly, a function of causing the resonance condition of the transmission antenna 5 to be variable can be added to each transmission power supply circuit 2. In addition, functions of causing the resonance conditions of the antennas 5 and 6 to be variable can be added to both the circuits 2 and 4, respectively.

Further, in the example shown in FIG. 1, the case in which the multiple wireless power transmission functions are disposed and the wireless transmission of the plurality of pieces of electric power each including an electric signal is performed in parallel is shown. However, this embodiment is not limited to this example. The movable portion transmission system can be alternatively configured in such a way that a single wireless power transmission function is disposed to perform wireless transmission of electric power including an electric signal.

Further, while the invention has been described in its preferred embodiment, it is to be understood that various changes can be made in an arbitrary component according to the embodiment, and an arbitrary component according to the embodiment can be omitted within the scope of the invention.

Industrial Applicability

The movable portion transmission system using wireless power transmission according to the present invention can implement, in a non-contact manner, the function of transmitting electric power by using a slip ring device, can achieve a reduction in the electric power loss (high efficiency) and can achieve downsizing, a weight reduction and a cost reduction. The movable portion transmission system is therefore suitable for use as a movable portion transmission system using wireless power transmission or the like that can implement, in a non-contact manner, the function of transmitting electric power by using a slip ring device which requires a mechanical contact.

EXPLANATIONS OF REFERENCE NUMERALS

1 primary transmission power supply, 2, 2a to 2c transmission power supply circuit, 3 transmitter and receiver, 4, 4a to 4c reception power supply circuit, 5, 5a to 5c transmission antenna, 6, 6a to 6c reception antenna, 7, 7a to 7c transmission side coil, and 8, 8a to 8c reception side coil.

The invention claimed is:

1. A movable portion transmission system using wireless power transmission which is performed via a rotary member, said movable portion transmission system comprising:
   a primary transmission power supply to supply electric power;
   a transmission antenna to perform wireless transmission of the electric power from the primary transmission power supply; and
   a reception antenna to receive the electric power from the transmission antenna;
   wherein the transmission antenna includes a transmission side coil in a spiral shape having successive conductor turns arranged along a same axial plane of the rotary member and each of the successive conductor turns has different diameters, a center of the spiral shape of the transmission side coil being an axial center of the rotary member, and the reception antenna includes a reception side coil in a spiral shape having successive conductor turns arranged along the same axial plane and each of the successive conductor turns has different diameters, a center of the spiral shape of the reception side coil being the axial center of the rotary member, wherein
   a plurality of sets each having the transmission antenna and the reception antenna are disposed, and are arranged at intervals along a direction of the axial center of the rotary member.

2. The movable portion transmission system using wireless power transmission according to claim 1, wherein
   each of the intervals has a length equal to or greater than maximum outer diameters of the transmission antenna and the reception antenna which pair up with each other.

3. The movable portion transmission system using wireless power transmission according to claim 1, wherein
   each of the intervals has a length equal to or greater than minimum inner diameters of the transmission antenna and the reception antenna which pair up with each other.

4. The movable portion transmission system using wireless power transmission according to claim 1, wherein
   the transmission antenna and the reception antenna perform wireless transmission in accordance with magnetic-field resonance.

5. The movable portion transmission system using wireless power transmission according to claim 1, wherein
   the transmission antenna and the reception antenna perform wireless transmission in accordance with electric-field resonance.

6. The movable portion transmission system using wireless power transmission according to claim 1, wherein
   the transmission antenna and the reception antenna perform wireless transmission in accordance with electromagnetic induction.

7. The movable portion transmission system using wireless power transmission according to claim 1, wherein
   each of the transmission side and reception side coils comprises two or more coils.

8. The movable portion transmission system using wireless power transmission according to claim 1, wherein
   the primary transmission power supply supplies electric power having a different frequency to each of the transmission antennas.

9. The movable portion transmission system sing wireless power transmission according to claim 1, further comprising:
   a reception power supply circuit to establish a resonance condition of the reception antenna; wherein
   the reception power supply circuit causes the resonance condition of the reception antenna to be variable in accordance with a transmission state of the reception antenna.

10. The movable portion transmission system using wireless power transmission according to claim 1, further comprising:
    a transmission power supply circuit to establish a resonance condition of the transmission antenna; wherein
    the transmission power supply circuit causes the resonance condition of the transmission antenna to be variable in accordance with a transmission state of the transmission antenna.

11. The movable portion transmission system using wireless power transmission according to claim 1, wherein
    the transmission antenna and the reception antenna belonging to a same set among the plurality of sets form a unit wireless power transmission system, and the transmission antenna and the reception antenna are disposed in different radial positions and the wireless power transmission is performed between the transmission antenna and the reception antenna in the unit wireless power transmission system.

* * * * *